United States Patent [19]

Sunami

[11] Patent Number: 4,985,694
[45] Date of Patent: Jan. 15, 1991

[54] CAR THEFT PROOFING SYSTEM

[76] Inventor: Sadakatsu Sunami, 8-3, Asukanokita 3-chome, Ikoma-shi, Nara-ken, Japan

[21] Appl. No.: 392,340

[22] Filed: Aug. 11, 1989

[30] Foreign Application Priority Data

Nov. 18, 1988 [JP]  Japan ................................ 63-293412

[51] Int. Cl.$^5$ ............................................. B60R 25/10
[52] U.S. Cl. ...................................... 340/426; 340/539;
340/542; 307/10.2; 200/61.64; 70/416;
70/DIG. 49; 70/DIG. 51; 180/173; 180/287
[58] Field of Search ............ 340/426, 541, 542, 825.41,
340/225.32, 539; 307/9.1, 10.1, 10.2, 10.3;
200/61.64; 70/416–419, 379 R, 357, DIG. 2, 21,
38, DIG. 49, 51; 180/173, 287

[56] References Cited

U.S. PATENT DOCUMENTS

| 3,668,526 | 6/1972 | Raskin | 340/539 |
| 3,936,673 | 2/1976 | Kelly et al. | 340/426 |
| 4,628,300 | 12/1986 | Amato | 340/426 |
| 4,665,385 | 5/1987 | Henderson | 340/539 |
| 4,855,710 | 8/1989 | Kikuchi et al. | 307/10.3 |

Primary Examiner—Donnie L. Crosland
Attorney, Agent, or Firm—Edwin E. Greigg

[57] ABSTRACT

A car theft proofing system includes a sensor attached to a door lock mechanism for detecting insertion into the door lock mechanism of a door key or other article, an alarm device for giving an alarm, an alarm drive device for driving the alarm device, a control unit for causing the alarm device to give the alarm in response to signals received from the sensor and the alarm drive device, and a radio transmitter for transmitting a radio wave upon insertion of the article. The alarm drive device includes a portable remote control transmitter and a receiver disposed on a car body. The remote control transmitter includes an abnormally alarm for transmitting a theft signal in response to the radio wave transmitted from the radio transmitter.

22 Claims, 7 Drawing Sheets

CAR THEFT PROOFING SYSTEM

BACKGROUND OF THE INVENTION (1) Field of the Invention

The present invention relates to car theft proofing systems, and more particularly to a car theft proofing system acting as a safeguard against a car theft in which a thief unlocks a car door.

(2) Cross-Reference to Related Applications

This application contains further improvements in the general subject matter disclosed in application Ser. No. 240,670 filed Sept. 6, 1988 and No. 368,723 filed June 21, 1989.

(2) Description of the Prior Art

Conventionally, when leaving a car, the car owner (driver), to avoid theft, stops the engine, pulls out the engine key, then shuts the windows and locks the door with a door key, or interlocks the door and shut it with the outside door grip turned up to lock the door.

However, thieves often unlock the doors of parked cars by inserting a wire, imitation key or other article into the cylinder door lock, or directly manipulate a door lock mechanism by inserting a thin plate through a space between the window pane and the door body. In this way, equipment such as car stereos and air-conditioners are stolen by thieves.

SUMMARY OF THE INVENTION

Having regard to the problem in safeguarding cars against theft, the object of the present invention is to provide a car theft proofing system which gives an alarm before a thief forces open a door, and notifies the car owner of the abnormality by a radio wave when the door is forced open, thereby to effectively prevent car theft. This car theft proofing system allows the car owner or authorized person to turn off alarm drive means and/or a sensor in the cylinder lock before opening the car door, so that the alarm will not sound with insertion into the cylinder lock of a door key.

Another object of the invention is to provide a car theft proofing system which safeguards against a picklock by using a door lock or a remote control transmitter to prevent rotation of an inner cylinder or insertion of a foreign object through the keyhole by fitting a contact element in a recess in the cylinder lock.

In order to achieve the above object, a car theft proofing system according to one aspect of the present invention comprises a sensor attached to a door lock mechanism for detecting insertion into the door lock mechanism of a plate, bar or other article, an alarm device for giving an alarm, alarm drive means to output a signal for driving the alarm device, control means to cause the alarm device to give the alarm in response to a signal received from the elongate sensor and the signal from the alarm drive means, and a radio transmitter for detecting insertion of the article and transmitting a radio wave, wherein the alarm drive means includes a portable remote control transmitter and a receiver disposed on a car body, the remote control transmitter including abnormality alarm means for transmitting a theft signal in response to the radio wave transmitted from the radio transmitter.

The characterizing feature of the invention lies in that the main part of the system includes a radio transmitter for detecting insertion of a foreign article and transmitting a radio wave, and that the alarm drive means includes a portable remote control transmitter and a receiver disposed on a car body, the remote control transmitter including abnormality alarm means for transmitting a theft signal in response to the radio wave transmitted from the radio transmitter.

Upon noting the abnormality, the car owner hurries to his or her car or reports to the police for catching the thief. Thus the system is effective for prevention of such a crime.

According to another aspect of the present invention, a car theft proofing system comprises a first sensor attached to a door lock mechanism for detecting insertion into the door lock mechanism of a plate, bar or other article, a second sensor attached to a cylinder door lock for detecting insertion into the door lock of a door key or other article, an alarm device for giving an alarm, alarm drive means to output a signal for driving the alarm device, control means to cause the alarm device to give the alarm in response to a signal received from at least one of the first and second sensors the signal from the alarm drive means, and a radio transmitter for detecting insertion of the article and transmitting a radio wave, wherein the alarm drive means includes a portable remote control transmitter and a receiver disposed on a car body, the remote control transmitter including abnormality alarm means for transmitting a theft signal in response to the radio wave transmitted from the radio transmitter.

The characterizing feature of the invention lies in that the main part of the system includes a radio transmitter for detecting insertion of a foreign article and transmitting a radio wave, and that the alarm drive means includes a portable remote control transmitter and a receiver disposed on a car body, the remote control transmitter including abnormality alarm means for transmitting a theft signal in response to the radio wave transmitted from the radio transmitter.

Upon noting the abnormality, the car owner hurries to his or her car or reports to the police for catching the thief. Thus the system is effective for prevention of such a crime.

In the present invention, the theft signal from the abnormality alarm device of the remote control transmitter is given by a buzzer or flashing of the lamp. The construction is therefore simple and effective for notifying the abnormality to the car owner.

The battery mounted in the car body may be used a system power source. This realizes a simple system, and greatly facilitates its provision in the car body.

The car battery may be used as an alarm driving power source for the system in the car body, and a reserve battery may be used for driving the other circuits. Then the load is reduced for the car battery, and the use of the car battery as the alarm driving power source allows the alarm to operate reliably.

The present invention sets a driving period to the alarm to avoid a long operation of the alarm. This is effective to reduce noise as well as the load for the alarm driving power source.

The remote control transmitter may include a device for forcibly turning off the alarm. Then a long alarm operation may be avoided to reduce noise and the load for the alarm driving power source when the car owner has operated the alarm in error or after a thief is caught.

According to the present invention, the system may be set by the remote control transmitter. Thus, the car owner can readily set the car theft proofing system from outside the car.

The system may be set when the engine is stopped by an engine key and the engine key is pulled out or the door is locked, assures automatic setting of the system and eliminates the possibility of a trouble occurring as a result of the owner forgetting to set the system.

The invention provides a set lamp in the car body for enabling confirmation that the system is set. This enables the car owner to readily confirm that the car theft proofing system is positively set, which promotes assurance for car theft prevention.

Further, the present invention provides a car theft proofing system comprising a cylinder lock including a recess extending from an outside position of an outer cylinder to a surface of an inner cylinder der, an engaging mechanism disposed outwardly of the cylinder lock at a position opposed to the recess, the engaging mechanism including an inwardly urged contact element engageable with and disengageable from the recess, a drive element disposed outwardly of the cylinder lock to move the contact element into the recess for stopping the inner cylinder against rotation, a sensor attached to a door lock mechanism for detecting insertion into the door lock mechanism of a plate, bar or other article, an alarm device for giving an alarm, alarm drive means to output a signal for driving the alarm device, control means to cause the alarm device to give the alarm in response to a signal received from the elongate sensor and the signal from the alarm drive means, and a radio transmitter for detecting insertion of the article and transmitting a radio wave, wherein the alarm drive means includes a portable remote control transmitter and a receiver disposed on a car body, the remote control transmitter including abnormality alarm means for transmitting a theft signal in response to the radio wave transmitted from the radio transmitter.

This construction, while being effective to preventing opening of the cylinder lock, allows the door lock mechanism to detect insertion of a foreign article and transmit a radio wave to notify the car owner of the abnormality. Upon noting the abnormality, the car owner hurries to his or her car or reports to the police for catching the thief. Thus the system is effective for prevention of such a crime.

The recess may extend to a central position of the inner cylinder for receiving the contact element. This construction is even more effective to prevent insertion of an imitation key or the like, thereby ensuring the theft proofing.

The car theft proofing system according to the present invention is applicable not only to automobile doors but to suitcase or other locks.

With the first aspect of the invention, when the car owner leaves the car, he or she sets the alarm device to be operable by the alarm drive means. When in this state a thief inserts a thin plate into the space between the window pane and the door panel, the sensor detects the thin plate and is turned on. As a result, the control means causes the alarm device to give an alarm in response to the signals from the alarm drive means and the sensor.

The abnormality is notified to the car owner by the radio wave transmitted from the radio transmitter. Then, the car owner hurries to his or her car or reports to the police for catching the thief. Thus the system is effective for prevention of such a crime.

On the other hand, the car owner or authorized person may cancel the operable state of the alarm device by means of the alarm drive means and/or the sensor before opening the car door. Consequently, in an emergency when the owner or authorized person does not have the car key in hand, the alarm will not sound with insertion of a thin plate into the space between the window pane and the door panel for undoing the door lock mechanism.

When leaving the car, the car owner sets the alarm device to be operable by the alarm drive means. When in this state a thief inserts an imitation key or other article into the cylinder lock or a thin plate through the space between the window pane and the door panel, the first or second sensor mounted is turned on. As a result, the control means causes the alarm device to give an alarm in response to the signals from the alarm drive means and one of the sensors.

The abnormality is notified to the car owner by the radio wave transmitted from the radio transmitter. Then, the car owner hurries to his or her car or reports to the police for catching the thief. Thus the system is effective for prevention of such a crime.

On the other hand, the car owner or authorized person may cancel the operable state of the alarm device by operating the alarm drive means and/or the sensor before opening the car door. Consequently, the alarm will not sound with insertion of the door key or other article into the cylinder lock.

Further, according to the present invention, the cylinder lock is prevented from being picked by holding the inner cylinder of the cylinder lock against rotation. Car theft may also be avoided by preventing insertion of an imitation key or the like into the inner cylinder of the cylinder lock.

Other advantages of the present invention will be apparent from the following description to be had with reference to the drawings.

BRIEF DESCRIPTION OF THE DRAWINGS

The drawings illustrate car theft proofing systems according to the present invention, in which.

DETAILED DESCRIPTION OF THE PREFERRED EMBODIMENTS

Embodiments of the present invention will particularly be described hereinafter, but the invention is not limited to such embodiments.

Figure 1:
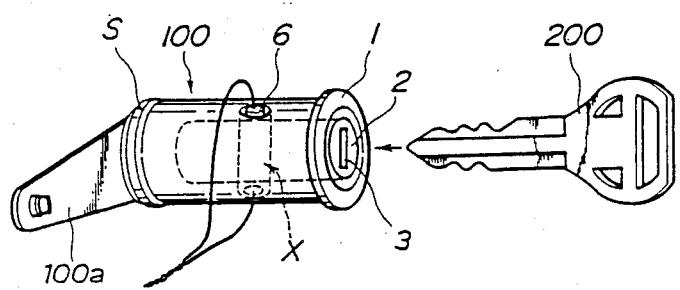
FIG. 1 is a perspective view of a cylinder lock for a car door.
Figure 2:
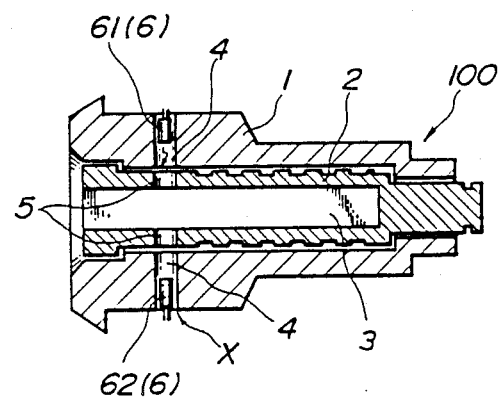
FIG. 2 is a sectional view of the cylinder lock.

FIG. 1 is a perspective view of a cylinder door lock of a car theft proofing system according to one embodiment of the present invention. FIG. 2 is a schematic sectional view of the cylinder door lock.

In FIGS. 1 and 2, the cylinder door lock 100 comprises a hollow outer cylinder 1 and an inner cylinder 2 rotatably mounted in the outer cylinder 1. The inner cylinder 2 has a keyhole 3 for removably receiving a door key 200.

The outer cylinder 1 includes bores 4, and the inner cylinder 2 includes bores 5. These bores 4 and 5 communicate with one another to define a through bore X when the door key 200 is removed from the inner cylinder 2.

More particularly, the inner cylinder 2 is constantly maintained in a predetermined position relative to the outer cylinder 1 under the urging force of a spring S unless the inner cylinder 2 is rotated by the door key 200. When the inner cylinder 2 is in the predetermined position, the bores 4 and 5 are aligned to define the through bore X.

The bores 4 of the outer cylinder 1 accommodate a sensor 6 for detecting insertion into the door lock 100 of the door key 200 or other articles. This sensor 6 will be described in detail hereinafter.

Figure 3:
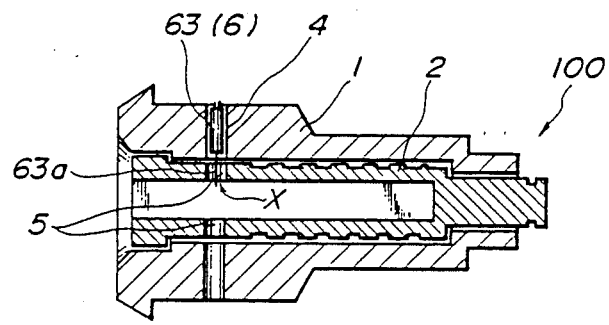
FIG. 3 is a sectional view of a modified cylinder lock.

The sensor 6 comprises, for example, a photosensor including a light emitting element and a light receiving element, a limit switch operable upon contact with the door key 200 or other articles, or a proximity switch.

Where the sensor 6 comprises a photosensor, the photosensor 6 includes a light emitting diode 61 and a phototransistor 62. The light emitting diode 61 is mounted in one of the bores 4 defined in the outer cylinder 1, and the phototransistor 62 in the other bore 4. Consequently, when the through bore X is formed, light emitted from the diode 61 passes through the through bore X and enters the phototransistor 62.

Where the sensor 6 comprises a limit switch, the switch 63, as shown in FIG. 3, is mounted in one of the bores 4 of the outer cylinder 1 with a contact 63a thereof extending into one of the bores 5 of the inner cylinder 2. The contact 63a is contactable by the door key 200 or other article inserted through the keyhole 3, whereby the sensor 6 is turned on to provide an output signal.

Figure 4:
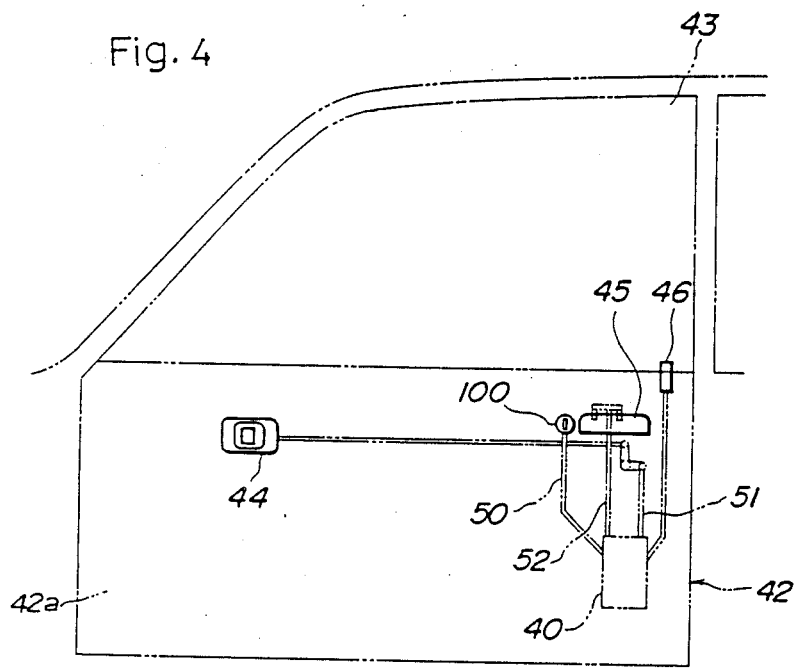
FIG. 4 is a front view of a door lock mechanism of the car theft proofing system.

FIG. 4 is a front view of an embodiment of the present invention in which a door lock mechanism includes a different sensor. FIG. 4 shows the door lock mechanism and adjacent devices.

In FIG. 4, number 42 indicates a door body, and number 43 indicates a window pane. The door lock mechanism 40 is disposed at a lower position inside the door body 42. A cylinder lock 100 is mounted above the door lock mechanism 40 and exposed to the ambient. Number 44 indicates an inside door knob, number 45 an outside door knob, and number 46 a window-side locking knob.

Figure 5A:
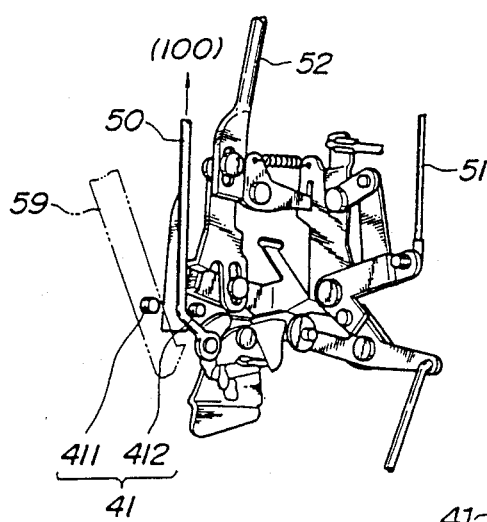
FIGS. 5(a) and 5(b) are perspective views of the door lock mechanism, respectively.
Figure 5B:
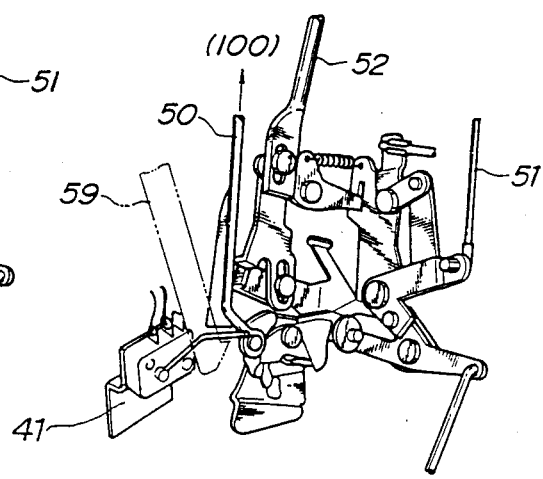

FIGS. 5(a) and 5(b) are perspective views showing details of the door lock mechanism 40.

The sensor 41 is included in the door lock mechanism 40 or disposed at an appropriate position in a space between the door lock mechanism 40 and the window pane 43.

The appropriate position means a position in or adjacent a passage of a thin plate 59 with which a thief intends to pick the door lock mechanism 40 which has been locked by a door key 200. For example, adjacent the lower end of a link 50 connected to the cylinder lock 100 shown in FIGS. 5(a) and 5(b), a light emitting diode 411 and a phototransistor 412 of a photosensor 41 are disposed as shown in FIG. 5(a) or a limit switch 41 is disposed as shown in FIG. 5(b).

In FIG. 5(a) and 5(b), number 51 indicates a link connected to the inside door knob 44, and number 52 a link connected to the outside door knob 45.

Figure 6:
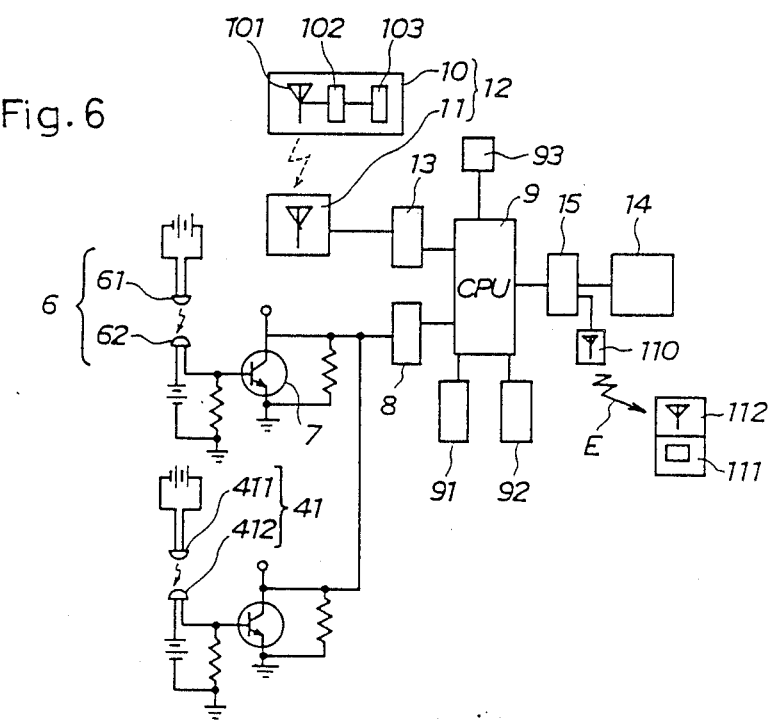
FIG. 6 is a block diagram of this embodiment.

FIG. 6 is a block diagram of a car theft proofing system according to the present invention.

The phototransistor 62 of the sensor 6 is connected to the base of another transistor 7 which gives an output through an I/O interface 8 to the CPU of a computer which is one example of control unit 9. The phototransistor 412 of the sensor 41 is likewise connected through the I/O interface 8 to the CPU 9.

An alarm drive device 12 acts as means to provide a signal for driving an alarm 14 to be described later and, as shown in FIG. 6, includes a remote control transmitter 10 and a receiver 11. The remote control transmitter 10 transmits radio waves with a frequency alloted to each car. This frequency may be shared to a certain extent by other cars as long as there is no possibility of interference (for example, interference may be avoided by regional allotment). The transmitter 10 includes an antenna 101, a transmitting unit 102, and a control unit 103 for controlling them.

The receiver 11 acts as means to receive the radio waves transmitted from the remote control transmitter 10, and is installed on the car. The receiver 11 is connected through an I/O interface 13 to the CPU 9.

The alarm drive device 12 need not necessarily comprise the radio wave transmitting remote control type but may be the light emitting remote control type. Alternatively, the alarm drive device 12 may be directly plugged into a connector provided on a car body, for example, to transmit a drive signal to the computer.

In this case, the drive signal may be prevented from being generated when the car owner or other authorized person plugs the alarm drive device 12 into the connector a second time. Further, the drive signal may be transmitted to and stored in the computer by plugging the alarm drive device 12 into the connector provided on the car body, the alarm being turned off by remote control for the owner or other authorized person to open the door.

The alarm 14 may comprise a buzzer for producing an extraordinary warning sound, a car horn, a signal lamp for emitting red light, or their combination. The alarm 14 is connected through an I/O interface 15 to the CPU 9.

A ROM 91 and a RAM 92 are connected to the CPU 9. The ROM 91 stores a program for causing the CPU 9 to output an alarm signal to the alarm 14 in response to the signals transmitted from the receiver 11 and the sensor 6. The RAM 92 is used for reading and writing data for the operation of CPU 9.

Number 93 indicates a set lamp for indicating that the system has been set. Software is provided for turning on this lamp when the system is set.

A radio transmitter 110 is connected to the I/O interface 15 for transmitting a radio wave E in response to the signal for driving the alarm 14. The remote control transmitter 10 includes an abnormality alarm device 111 for transmitting a theft signal in response to the radio wave E transmitted from the radio transmitter 110.

Number 112 indicates a radio receiver included in the remote control transmitter which receives the radio wave E for the alarm device 111 to transmit the theft signal.

When the car owner notes the abnormality by the buzzer or pilot lamp, he may hurry to his car and catch a thief or report to the police. This is very effective to prevent such a crime.

Figure 7:
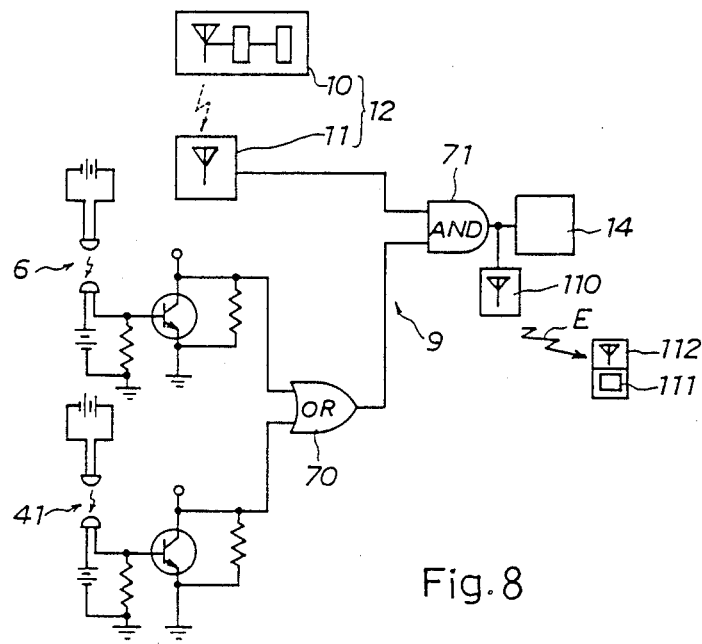
FIG. 7 is a block diagram of another car theft proofing system according to the present invention.

FIG. 7 is a block diagram of another embodiment of the present invention.

In FIG. 7, the control unit 9 includes an OR circuit 70 and an AND circuit 71 of logic elements. The OR circuit 70 receives the outputs of the photosensor 6 and the photosensor 41. The AND circuit 71 receives the output of the receiver 11 and an output signal of the OR circuit 70, and in response to these signals outputs a drive signal to the alarm 14.

A radio transmitter 110 is connected between the control unit 9 and the alarm 14 for transmitting a radio wave E in response to the signal for driving the alarm 14. The remote control transmitter 10 includes an abnormality alarm device 111 for transmitting a theft signal in response to the radio wave E transmitted from the radio transmitter 110.

Number 112 indicates a radio receiver included in the remote control transmitter which receives the radio wave E for the alarm device 111 to transmit the theft signal.

Figure 8:
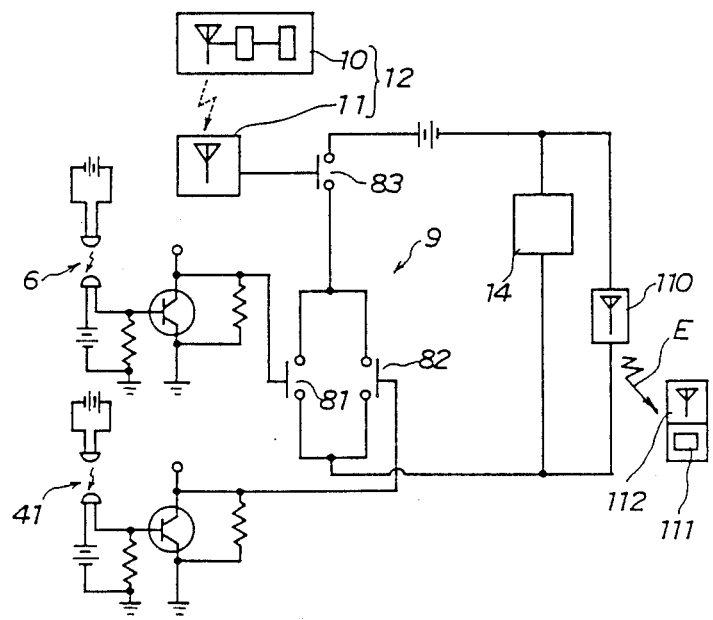
FIG. 8 is a block diagram of a further car theft proofing system according to the present invention.

FIG. 8 is a block diagram of a further embodiment of the present invention.

In FIG. 8, the control unit 9 includes a first switch 81 and a second switch 82 in parallel connection, and a third switch 83 connected in series thereto. The first switch 81 is connected to the sensor 6, the second switch 82 to the sensor 41, and the third switch 83 to the receiver 11. In this case too, the control unit 9 receives the signals from the sensor 6, sensor 41 and receiver 11, and outputs a drive signal to the alarm 14 only when at least one of the sensors 6 and 41 is turned on and the receiver 11 transmits the signal.

The above series circuit includes a radio transmitter 110 connected parallel to the alarm 14 for transmitting a radio wave E in response to the signal for driving the alarm 14. The remote control transmitter 10 includes an abnormality alarm device 111 for transmitting a theft signal in response to the radio wave E transmitted from the radio transmitter 110.

Number 112 indicates a radio receiver included in the remote control transmitter which receives the radio wave E for the alarm device 111 to transmit the theft signal.

An operation of the foregoing embodiments where the sensor 6 comprises a photosensor will particularly be described next.

When the car owner leaves the car, he or she shuts the window, locks the door, and operates the remote control transmitter 10 to transmit the signal. This signal is received by the receiver 11 and input to the CPU (control unit) 9.

Assume that a thief approaches the car in this state, and attempts to open the car door by inserting a thin plate, bar, imitation key or the like into the cylinder door lock 100. When the door lock 100 is turned by the article inserted thereto, the through bore X is broken and the light from the sensor 6 is interrupted. As a result, the sensor detects entry of the picklock instrument. The turn-on signal of the sensor 6 is input through the I/O interface 8 to the CPU 9.

The thief may try to undo the lock mechanism 40 by inserting the thin plate 59 through the space between the window pane 43 and the door panel 42a. With insertion of the thin plate 59, the light of the sensor 41 is interrupted and the turn-on signal is output. The turn-on signal of the sensor 41 is input through the I/O interface 8 to the CPU 9.

In one of the above states, the CPU 9 outputs the alarm signal to the alarm 14 in response to the signal from the receiver 11 and the signal from the sensor 6 or sensor 41. Thus an alarm buzzer is given before the thief opens the door by means of a picklock instrument, whereby the car is safeguarded against theft. The period for alarm sounding may be preset to the CPU 9, or the alarm may be allowed to continue until the CPU (control unit) 9 is turned off.

The I/O interface 15 includes the radio transmitter 110 for transmitting a radio wave E in response to the signal for driving the alarm 14. The remote control transmitter 10 includes the abnormality alarm device 111 for transmitting a theft signal in response to the radio wave E transmitted from the radio transmitter 110. Thus, when the car owner notes the abnormality by the buzzer or pilot lamp, he may hurry to his car and catch a thief or report to the police. This is very effective to prevent such a crime.

On the other hand, when the car owner or authorized person intends to open the car door with the door key, he or she cancels the alarm drive signal by means of the remote control transmitter 10. Then the alarm will not sound with insertion into the door lock 100 of the door key since the signal is not input from the receiver 11 though the sensor 6 gives the turn-on signal.

As does the CPU 9, the OR circuit 70 and AND circuit 71 in the embodiment of FIG. 7, and the series circuit 81-83 in the embodiment of FIG. 8 confirm input of the signals from the receiver 11 and from the sensor 6 or sensor 41, and output the alarm signal to the alarm 14.

The I/O interface 15 includes the radio transmitter 110 for transmitting a radio wave E in response to the signal for driving the alarm 14. The remote control transmitter 10 includes the abnormality alarm device 111 for transmitting a theft signal in response to the radio wave E transmitted from the radio transmitter 110. Thus, when the car owner notes the abnormality by the buzzer or pilot lamp, he may hurry to his car and catch a thief or report to the police. This is very effective to prevent such a crime.

Thus, according to the present invention, before the car door is opened by a thief, the sensor 6 detects entry of the door key 200 or other article and sounds the alarm. The car owner or authorized person is able to insert the door key through the keyhole 3 and undo the door lock without sounding the alarm by turning off the alarm drive device and/or the sensor beforehand.

In the present invention, the theft signal from the abnormality alarm device 111 of the remote control transmitter 10 is given by a buzzer or flashing of the lamp. The construction is therefore simple and effective for notifying the abnormality to the car owner.

Figure 9:
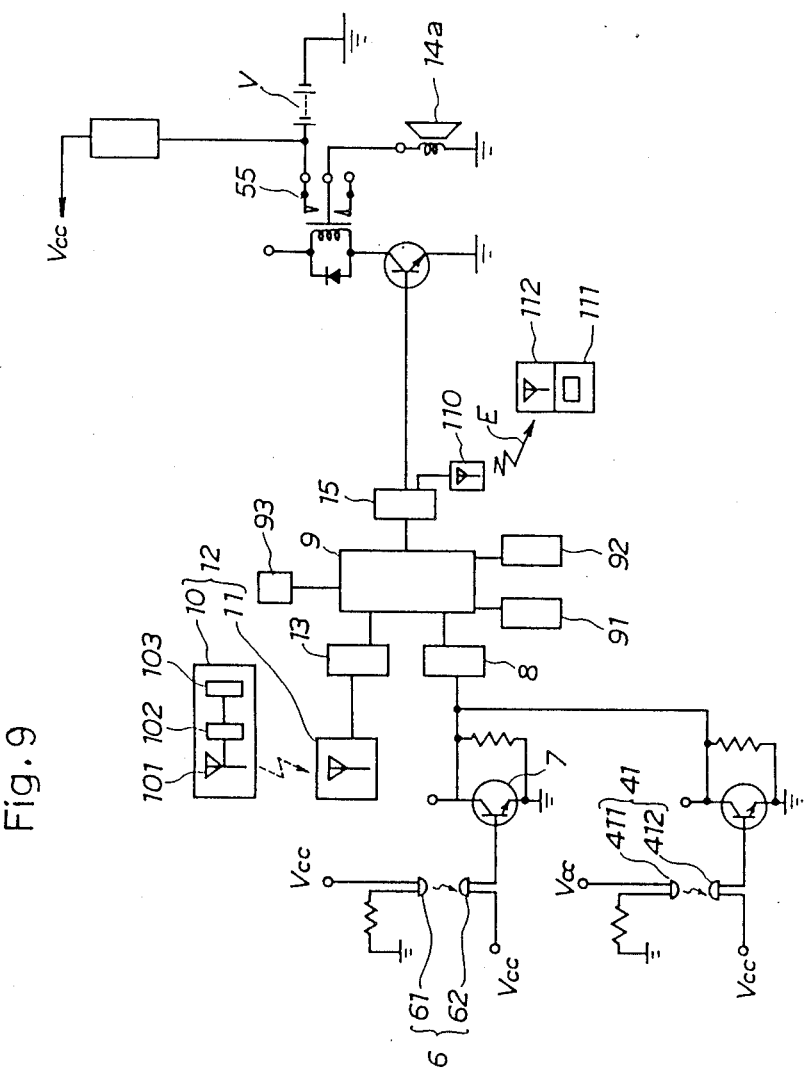
FIGS. 9 and 10 are block diagrams of further car theft proofing systems, respectively.

As shown in FIG. 9, the battery mounted in the car body may be used a system power source V. This realizes a simple system, and greatly facilitates its provision in the car body.

Figure 10:
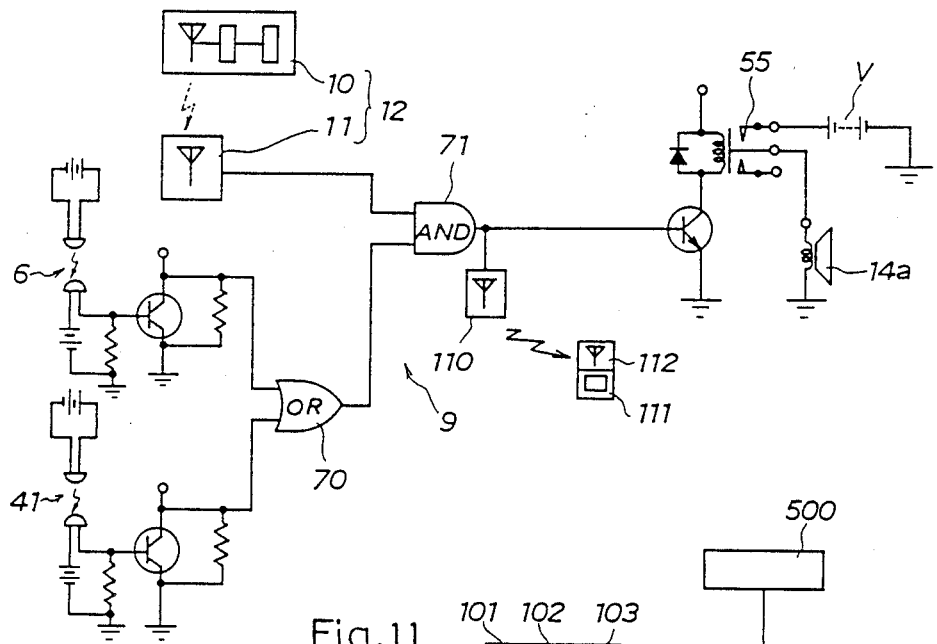

As shown in FIG. 10, the car battery may be used as an alarm driving power source for the system in the car body, and a reserve battery may be used for driving the other circuits. Then the load is reduced for the car battery, and the use of the car battery as the alarm driving power source V allows the alarm to operate reliably.

Number 55 in FIG. 8 indicates a relay for supplying power to the buzzer 14a when a thief opens the lock.

The present invention sets a driving period to the alarm 14 to avoid a long operation of the alarm 14. This is effective to reduce noise as well as the load for the alarm driving power source.

The remote control transmitter 10 may include a device for forcibly turning off the alarm 14. Then a long alarm operation may be avoided to reduce noise and the load for the alarm driving power source when the car owner has operated the alarm 14 in error or after a thief is caught.

According to the present invention, as shown in FIGS. 6 and 9, the car body includes the set lamp 93 for enabling confirmation that the system is set by the remote control transmitter 10. Thus, the car owner can readily confirm that the car theft proofing system is positively set, which promotes assurance for car theft prevention.

The system may be set to the car body by the remote control transmitter according to the present invention as noted above. This advantageously enables the car owner to readily set the system from outside the car.

Figure 11:
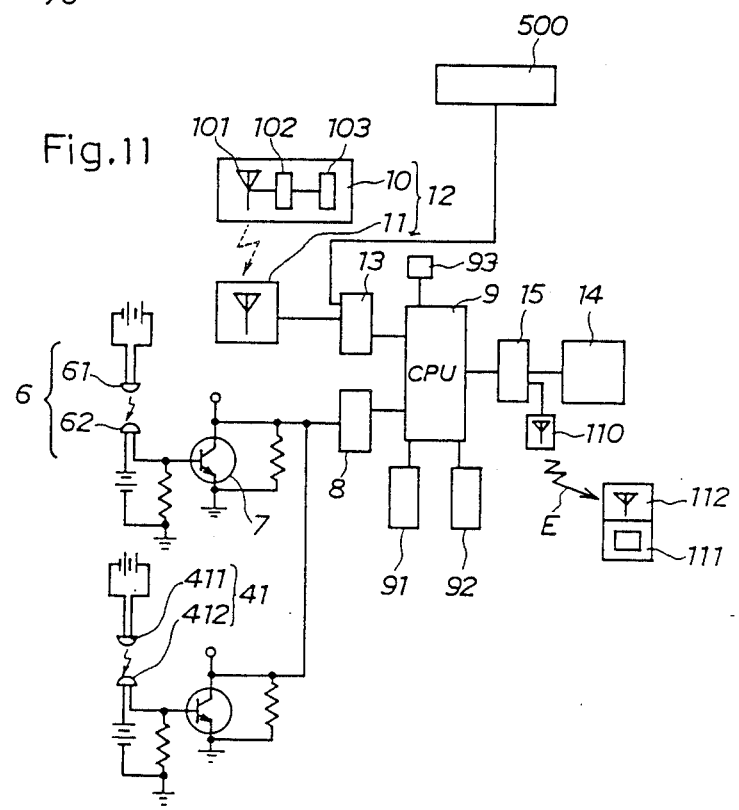
FIG. 11 is a block diagram of a further car theft proofing system according to the present invention.

As shown in FIG. 11, a window/door lock mechanism 500 may output a system setting signal to automatically set the system when the car owner stops the engine and pulls out the engine key, or shuts the door and locks it with a door key, or interlocks the door and shut it with the outside door grip turned up to lock the door. Then, the system is set as the car owner takes the above action, hence eliminating the possibility of the owner forgetting to set the system.

In this case, a system switch may be provided where the engine key is inserted, or a limit switch, a proximity switch or a mercury switch provided at or adjacent an interlocked element 100a of the cylinder lock 100 which switch is operable to set the system with rotation of the inner cylinder 2 caused by the door key 200. Alternatively, the system may be set by a proximity switch operable through contact with an operating rod when the car door is interlocked.

Further, in this case, the remote control transmitter 10 is used to turn off the alarm 14 when the car owner opens the car door.

Figure 12:
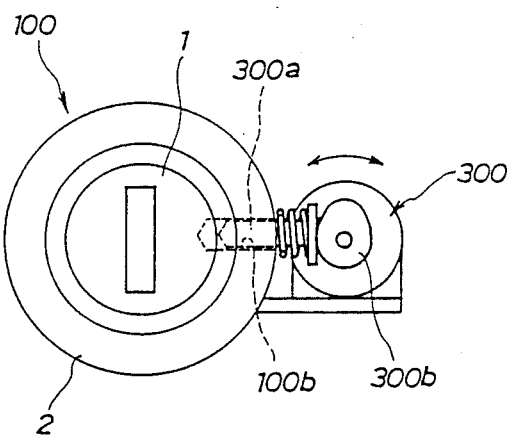
FIGS. 12 through 14 are side views of different embodiments, respectively.

According to the present invention, as shown in FIG. 12, the cylinder lock 100 may include a recess 100b extending from an outside position of the outer cylinder 1 to the surface of the inner cylinder 2. An engaging mechanism 300 is provided outwardly of the cylinder lock 100 at a position opposed to the recess 100b. The engaging mechanism 300 includes an inwardly urged contact element 300a engageable with and disengageable from the recess 100b. Further, a drive element 300, which comprises an eccentric cam in this example, is disposed outwardly of the cylinder lock 100 to move the contact element 300a into the recess 100b for stopping the inner cylinder 2 against rotation. Thus, when a thief attempts to turn the cylinder lock 100 by inserting an imitation key or the like, the inner cylinder 2 is held against rotation by the contact element 300a, thereby preventing the picklock.

Figure 13:
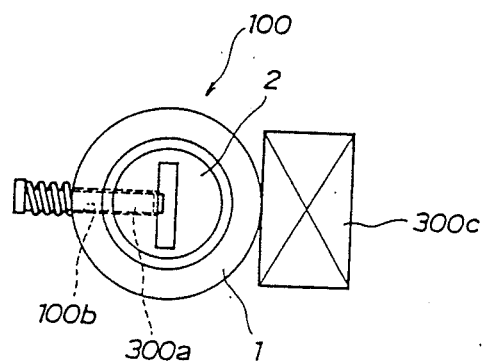
Figure 14:
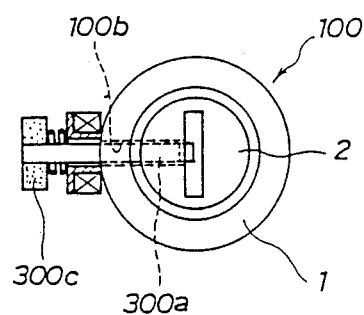

Further, as shown in FIGS. 13 and 14, the recess 100b may extend to a central position of the inner cylinder 2 for receiving the contact element 300a, which is effective to prevent insertion of an imitation key or the like, thereby ensuring the theft proofing. In this case, the contact element 300a may be drivin by a solenoid 300c or other means.

The output signal of the sensor 6 may be transmitted through an optical fiber cable. This will promote reliability with less chances of operational errors due to noise.

The sensor 6 may be turned on, with the cable leading to the engine electrically broken, when the engine is stopped and the engine key is pulled out. Consequently, the engine will not started when the cable is connected.

Further, the senosr 6 may be turned on when the engine is stopped and the engine key is pulled out. With the sensor 6 is once turned on, the alarm may continue after opening of the door until the sensor 6 is turned off by using the alarm drive means 12.

The foregoing embodiments of the present invention have the following functions and advantages:

(1) The theft signal comprising a buzzer or flashing of a lamp realizes a simple construction and positively notifies an abnormality to the car owner or authorized driver.

(2) The use of a car battery as a system power source mounted in the car body simplifies the system and greatly facilitates its provision in the car body.

(3) The use of a car battery as a system power source mounted in the car body, and a reserve battery as a power source for driving other circuits has the advantages that the load is reduced for the car battery, and the alarm operates reliably.

(4) The driving period set for the alarm is effective to avoid a long operation of the alarm thereby reducing noise, and greatly lighten the load for the alarm driving power source.

(5) The remote control transmitter including means to forcibly turn off the alarm avoids a long alarm operation to reduce noise and the load for the alarm driving power source when the car owner has operated the alarm 14 in error or after a thief is caught.

(6) The feature that the remote control transmitter is operable to set the system to an operable state in the car body, enables the car owner to readily set the system from outside the car.

(7) The feature that the system is set when the engine is stopped by an engine key and the engine key is pulled out or the door is locked, assures automatic setting of the system and eliminates the possibility of a trouble occurring as a result of the owner forgetting to set the system.

(8) The set lamp provided for enabling confirmation that the system is set enables the car owner to readily confirm that the car theft proofing system is positively set, which promotes assurance for car theft prevention.

(9) When a thief attempts to turn the cylinder lock by inserting an imitation key or the like, the inner cylinder is held against rotation by the contact element, thereby preventing the picklock.

(10) The feature that the recess extends to a central position of the inner cylinder for receiving the contact element is effective to prevent insertion of an imitation key or the like, thereby ensuring the theft proofing.

What is claimed is:

1. A car theft proofing system comprising an elongate sensor attached to a door lock mechanism for detecting insertion into the door lock mechanism of a plate, bar or other article, an alarm device for giving an alarm, alarm drive means to output a signal for driving the alarm device, control means to cause the alarm device to give the alarm in response to a signal received from the elongate sensor and the signal from the alarm drive means, and a radio transmitter for detecting insertion of the article and transmitting a radio wave, wherein said alarm drive means includes a portable remote control transmitter and a receiver disposed on a car body, said remote control transmitter including abnormality alarm means for transmitting a theft signal in response to the radio wave transmitted from said radio transmitter.

2. A car theft proofing system as claimed in claim 1, wherein a car battery is used as a system power source mounted in the car body.

3. A car theft proofing system as claimed in claim 1, wherein a car battery is used as a system power source mounted in the car body, and a reserve battery is used as a power source mounted in the car body for driving other circuits.

4. A car theft proofing as claimed in claim 1, wherein said theft signal comprises a buzzer.

5. A car theft proofing system as claimed in claim 1, wherein a drive period is set for said alarm.

6. A car theft proofing system as claimed in claim 1, wherein said remote control transmitter includes means to forcibly turn off said alarm.

7. A car theft proofing system as claimed in claim 1, wherein said remote control transmitter is operable to set the system to any operable state.

8. A car theft proofing system as claimed in claim 1, wherein the system is set when an engine is stopped by an ignition key and the ignition key is pulled out or the door is locked.

9. A car theft proofing system as claimed in claim 7, further comprising a set lamp for enabling confirmation that the system is set.

10. A car theft proofing system as claimed in claim 1, wherein said theft signal comprises flashing of a lamp.

11. A car theft proofing system as claimed in claim 8, further comprising a set lamp for enabling confirmation that the system is set.

12. A car theft proofing system comprising a first sensor attached to a door lock mechanism for detecting insertion into the door lock mechanism of a plate, bar or other article, a second sensor attached to a cylinder door lock for detecting insertion into the door lock of a door key or other article, an alarm device for giving an alarm, alarm drive means to output a signal for driving the alarm device, control means to cause the alarm device to give the alarm in response to a signal received from at least one of the first and second sensors the signal from the alarm drive means, and a radio transmitter for detecting insertion of the article and transmitting a radio wave, wherein said alarm drive means includes a portable remote control transmitter and a receiver disposed on a car body, said remote control transmitter including abnormality alarm means for transmitting a theft signal in response to the radio wave transmitted from said radio transmitter.

13. A car theft proofing system as claimed in claim 12, wherein said theft signal comprises a buzzer.

14. A car theft proofing system as claimed in claim 12, wherein said theft signal comprises flashing of a lamp.

15. A car theft proofing system as claimed in claim 12, wherein a car battery is used as a system power source mounted in the car body.

16. A car theft proofing system as claimed in claim 12, wherein a car battery mounted in the car body is used as a system power source and a reserve battery mounted in the car body is used as a power source for driving other circuits.

17. A car theft proofing system as claimed in claim 12, wherein a drive period is set for said alarm.

18. A car theft proofing system as claimed in claim 12, wherein said remote control transmitter includes means to forcibly turn off said alarm.

19. A car theft proofing system as claimed in claim 12, wherein said remote control transmitter is operable to set the system to an operable state.

20. A car theft proofing system as claimed in claim 12, wherein the system is set when an engine is stopped by an ignition key and the ignition key is pulled out or the door is locked.

21. A car theft proofing system comprising a cylinder lock including a recess extending from an outside position of an outer cylinder to a surface of an inner cylinder, an engaging mechanism disposed outwardly of the cylinder lock at a position opposed to the recess, said engaging mechanism including an inwardly urged contact element engageable with and disengageable from the recess, a drive element disposed outwardly of the cylinder lock to move the contact element into the recess for stopping the inner cylinder against rotation, an elongate sensor attached to a door lock mechanism for detecting insertion into the door lock mechanism of a plate, bar or other article, an alarm device for giving an alarm, alarm drive means to output a signal for driving the alarm device, control means to cause the alarm device to give the alarm in response to a signal received from the elongate sensor and the signal from the alarm drive means, and a radio transmitter for detecting insertion of the article and transmitting a radio wave, wherein said alarm drive means includes a portable remote control transmitter and a receiver disposed on a car body, said remote control transmitter including abnormality alarm means for transmitting a theft signal in response to the radio wave transmitted from said radio transmitter.

22. A car theft proofing system as claimed in claim 21, wherein said recess extends to a central position of the inner cylinder for receiving the contact element, to prevent insertion of a door key or the like.

* * * * *